Effects of Temperature on Dielectric Constant.

United States Patent Office 3,267,072
Patented August 16, 1966

3,267,072
METHOD OF MAKING THERMALLY STABLE SILOXANE POLYMERS CONTAINING RING STRUCTURES
Alvin D. Delman, Plainview, Rainer J. Katzenstein, Richmond Hill, Alban E. Ruff, New York, and Bernard B. Simms, Franklin Square, N.Y., assignors to the United States of America as represented by the Secretary of the Navy
Filed May 16, 1963, Ser. No. 281,070
1 Claim. (Cl. 260—46.5)

The invention described herein may be manufactured and used by or for the Government of the United States of America for governmental purposes without the payment of any royalties thereon or therefor.

This invention relates to siloxane polymers that have high resistance to degradation at elevated temperatures.

Currently available polymeric materials are incapable of functioning as effectively as desired at high temperatures without serious degradation, and there is an increasing need for new polymeric systems that are suitable for use in diverse high temperature applications and which have maximum resistance to degradation under thermal radiation energy and other environmental extremes.

An object of this invention is to provide a polymeric resin which will withstand diverse high temperatures with minimum degradation, which exhibits a weight loss not materially exceeding about 10% when heated at 180° C./hr. to 500° C., and also to provide a novel method of making such a resin.

Another object is to provide a relatively simple, practical and inexpensive method of making a resin with a relatively high thermal stability.

Other objects and advantages will appear from the following description of examples of the invention, and the novel features will be particularly pointed out in connection with the appended claims.

Figure 1:
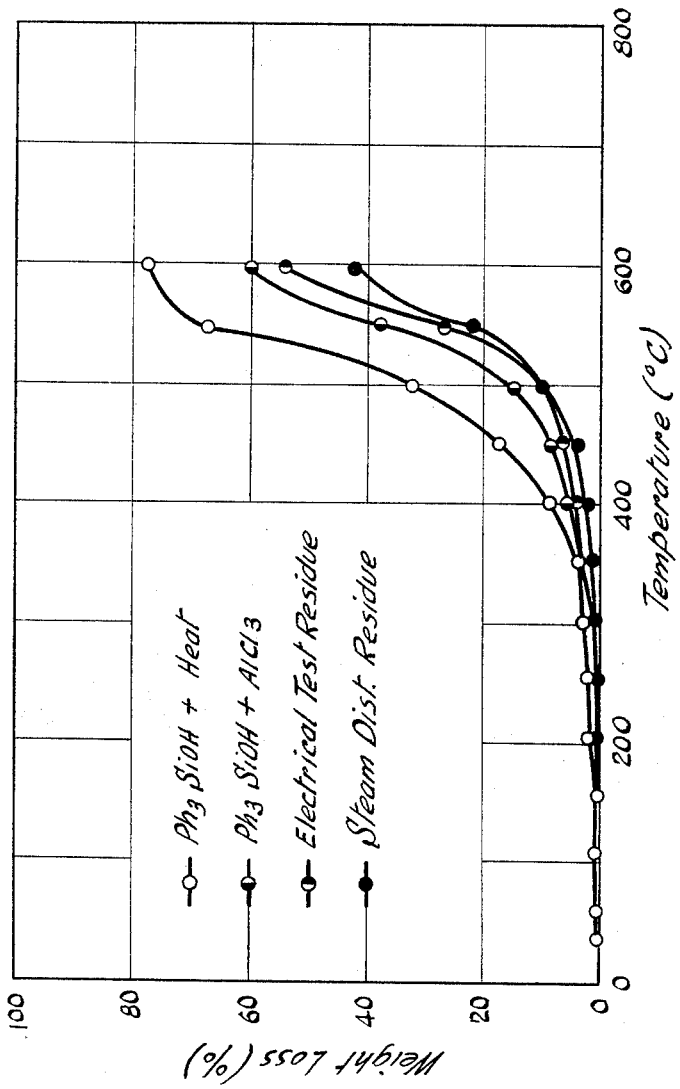
Figure 2:
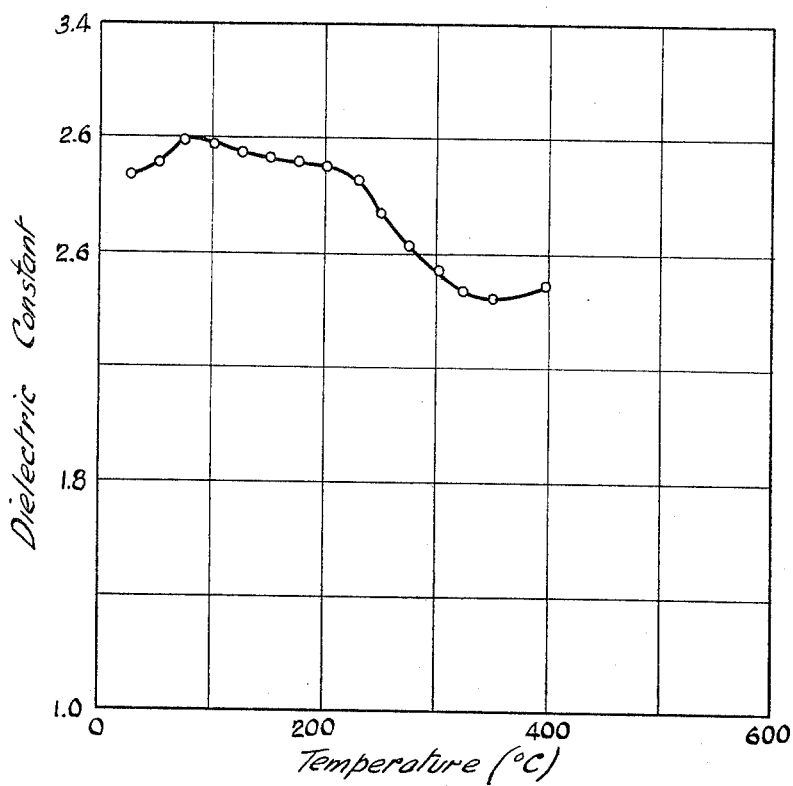

In the accompanying drawings:

FIG. 1 is a chart illustrating the heat resistance of the novel catalytically polymerized phenylsilanol in comparison with such a phenylsilanol that is unpolymerized, and FIG. 2 is a chart illustrating the effect of temperature on the dielectric constant of the novel catalytically polymerized phenylsilanol.

We have discovered that a thermally stable siloxane polymer containing ring structures can be prepared by heating phenylsilanols, such as triphenylsilanol or diphenylsilandiol, for example, at a temperature between about 200° C. and about 250° C. in the presence of catalytic amounts of Lewis acid compounds such as, for example, aluminum chloride, boron chloride, zirconium tetrachloride, and ferric chloride, and that such a siloxane polymer will successfully withstand higher temperatures and thermal radiations without degradation than will polymeric materials that have been currently available. To illustrate this the following examples were performed.

Example I

A quantity of 100.0 g. (0.362 mole) of triphenylsilanol ($Ph_3SiOH$) was mixed with 0.89 g. ($6.7 \times 10^{-3}$ mole) of anhydrous aluminum chloride ($AlCl_3$) (Si/Al; 54/1 mole). This mixture was heated in standard heat resistant glassware during one hour to a temperature between about 225° C. and about 250° C., after which the mixture was maintained at such temperature for an additional two hours. The heated mixture was then cooled to room temperature, during or after which the mixture was vacuum-stripped to remove volatile components that were collected separately of the mixture in a freeze-out trap. While still maintaining the vacuum, the heating cycle was repeated on the residue, the volatile ingredients liberated during the reheating were collected, and the residue from the reheating was separated by solvent extraction.

The specimen obtained in this manner was a clear, colorless, hard, brittle resinous product that dissolves in benzene, chloroform, acetone, ethyl ether and ethyl acetate and is insoluble in petroleum ether and absolute ethyl alcohol. It is not affected appreciably when exposed to steam for about two hours or when heated to 400° C. at 120° C./hr. An infrared spectrogram of the specimen indicated the presense of $Ph_2Si=$ Structures in the molecules. Absorption bands also occur at 9.40 and 9.85$\mu$ which are interpreted to be due to $\equiv Si-O-Si\equiv$ structures of branched open-chain and cyclic trimer siloxanes, respectively. Elemental analysis shows that the said specimen so obtained contains 14.2% Si, and in addition, this reaction product contains 0.05% and 0.20% of Al and Cl, respectively, which is believed due to a small amount of aluminum chloride that was present in the product as a contaminant. It is postulated that the structural formula for this specimen of resin is as follows:

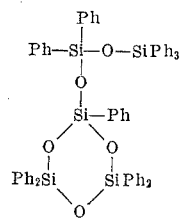

When some of this resin specimen was heated at 180° C. per hour to a temperature of 500° C. it suffered a weight loss of about 15.2%, but only losses of 9.2% and 10.1% after being treated for about two hours with steam and when preheated at 120° C. per hour to 400° C. respectively. Infrared data does not indicate any significant chemical changes induced by the steam and preheating treatments.

Example II

A mixture of 100.78 g. (0.467 mole) of $Ph_2Si(OH)_2$ with 1.39 g. ($10.4 \times 10^{-3}$ mole) of $AlCl_3$ was treated in the same manner as explained for Example I and yielded 75.92 g. of a hard resinous product, 20.11 g. of benzene and 5.42 g. of water. The product contained 17.2% of Si but no aluminum or chloride. This also indicates that the resinous product from $Ph_3SiOH$ in the presence of aluminum chloride was obtained through a process of catalytic polymerization. The thermal stability and solubility properties of this resin are almost identical to those of the product given by a $Ph_3SiOH$-$AlCl_3$ reaction product. On the basis of the Si content of the resin and infrared data, the siloxane polymer appears to be comprised of molecular chains such as:

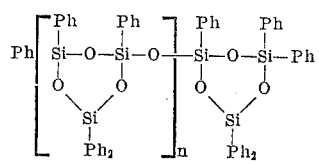

Example III

A mixture of 21.76 g. (0.101 mole) of $Ph_2Si(OH)_2$ and 0.30 g. ($2.25 \times 10^{-3}$ mole) of $AlCl_3$ when treated in the manner described for Example I gave 9.42 g. of a hard, brittle, colorless, infusible and insoluble resinous product containing 21.4% Si and traces of Al and Cl. The infrared spectrum of this infusible material indicates that this material probably contains cyclic trimer groups with $\equiv Si-O-Si\equiv$ bonds, and that it contains a smaller number of $Ph_2$—$Si\equiv$ structures than the soluble materials obtained from $Ph_3SiOH$. This suggests that the infusible product obtained from the $Ph_2Si(OH)_2$-$AlCl_3$ reaction was formed by a Ph—Si bond cleavage process. The formation of benzene during the reaction tends to confirm this assumption. On this basis, it is postulated that similar Ph—Si bond cleavage processes occur in the $Ph_3SiOH$-$AlCl_3$ reaction. The $Ph_2Si(OH)_2$-$AlCl_3$ reaction also yielded 6.26 g. of an ether-soluble, colorless, hard, brittle resin fraction containing 17.2% Si.

We have found that an increase of catalyst concentration produces polysiloxanes with open-chain rather than cyclic configurations, and with such increase of catalyst with $Ph_3SiOH$ one does not obtain infusible, crosslinked products. The results indicate that phenyl-substituted polysiloxanes that contain cyclic structures are more pyrolytically stable than similar substances containing only linear configurations. Hence, only catalytic amounts of the Lewis acid should be used.

While any of the Lewis acids may be used as the polymerization catalyst, the aluminum chloride appears to be most reactive of the Lewis acids as the catalyst, and since it is readily available and relatively inexpensive, it is at present the preferred catalyst.

FIG. 1 of the drawing illustrates the lesser weight loss under increasing temperatures when $Ph_3SiOH$ was catalyzed with $AlCl_3$, instead of without the catalyst. This figure shows that a weight loss of 15.2% occurred when the product was heated at 180° C./hr. to 500° C. but only loses 9.2% and 10.1% after being treated for about two hours with steam and when preheated at 120° C./hr. to 400° C. respectively. Infrared data do not indicate any significant chemical changes induced by the steam and preheating treatments.

FIG. 2 of the drawing illustrates the variations in the dielectric constant when the product of this discovery is subjected to increasing heat. This diagram shows that the dielectric constant increases until the new product is heated to about 70° C. then decreases. This indicates that the changes of electrical characteristics occurs during the heating period when this new resinous material undergoes a phase transition from the solid to fluid state. The dielectric constant increases at $8.0 \times 10^{-4}$ per ° C. during the heat treatment of the material at 100° to 235° C. and then, to about 325° C., the rate of decrease changes to $6.4 \times 10^{-3}$ per ° C. The rate change of electrical properties occurs at about the point in the heating process at which the substance begins to volatilize. The perphenylated siloxanes that are comprised of only linear molecular structures are less resistant to degradation by heat than similar products containing cyclic groups.

When heated to a temperature of about 225° C. to 250° C., triphenylsilanol and a catalytic amount of $AlCl_3$ the silanol undergoes exchange reactions with the catalytic amount of the $AlCl_3$ to yield a difunctional silanol and an intermediate organoaluminum compound. At these temperatures, the difunctional silanol molecules condense to give branched open-chain polymers with attached cyclic siloxane structures and hydrochloric acid. The organoaluminum compound interacts with the hydrochloric acid to yield benzene and regenerated $AlCl_3$ which latter then combines with unreacted $Ph_3SiOH$ and the sequence is repeated. The reaction is terminated when all of the unreacted $Ph_3SiOH$ is combined, or when HCl is removed from the system. When similarly treated in the absence of $AlCl_3$, triphenylsilanol gives polymers with only linear configurations that are less thermally stable than the siloxanes that contain the cyclic siloxanes.

It will be understood that various changes in the details, materials and arrangements of parts (and steps), which have been herein described and illustrated in order to explain the nature of the invention, may be made by those skilled in the art within the principle and scope of the invention as expressed in the appended claim.

We claim:

The method of making a thermally stable siloxane resinous polymer containing ring structures which comprises:

mixing 100 parts of triphenylsilanol and 0.89 part of anhydrous aluminum chloride by weight, heating the mixture during one hour to a temperature between about 225° C. and about 250° C., and maintaining that temperature of the mixture for an additional two hours, cooling the mixture at room temperature, vacuum stripping the mixture, repeating the heating cycle under vacuum, and then vacuum stripping the reheated residue and separating the resin from such residue by solvent extraction.

References Cited by the Examiner

UNITED STATES PATENTS

| | | | |
|---|---|---|---|
| 2,371,050 | 3/1945 | Hyde | 260—46.5 |
| 2,371,068 | 3/1945 | Rochow | 260—46.5 |
| 3,000,858 | 9/1961 | Brown | 260—46.5 |

FOREIGN PATENTS 594,481  11/1947  Great Britain.

LEON J. BERCOVITZ, *Primary Examiner.*

SAMUEL H. BLECH, *Examiner.*

M. I. MARQUIS, *Assistant Examiner.*